E. BAUGHN.
ELECTRICAL LIQUID HEATING DEVICE.
APPLICATION FILED FEB. 17, 1916.
1,202,957.
Patented Oct. 31, 1916.
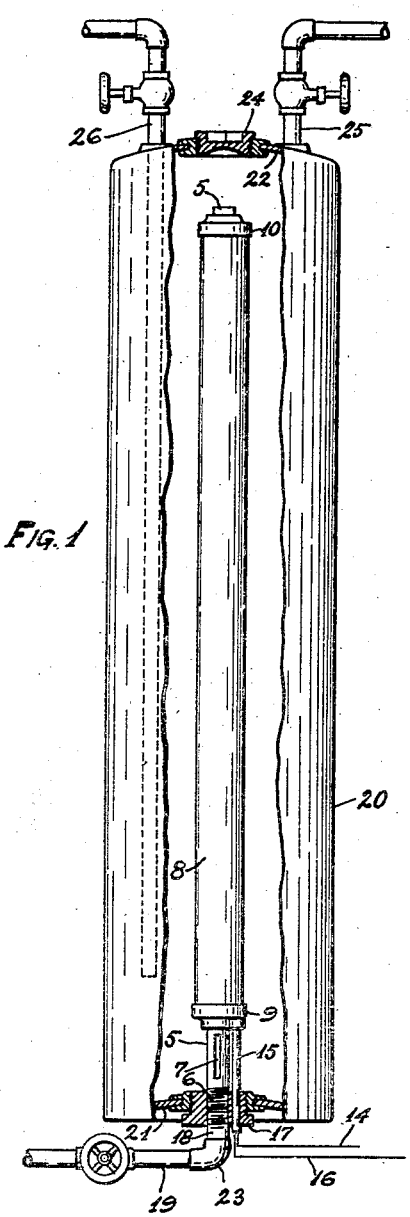
FIG. 1
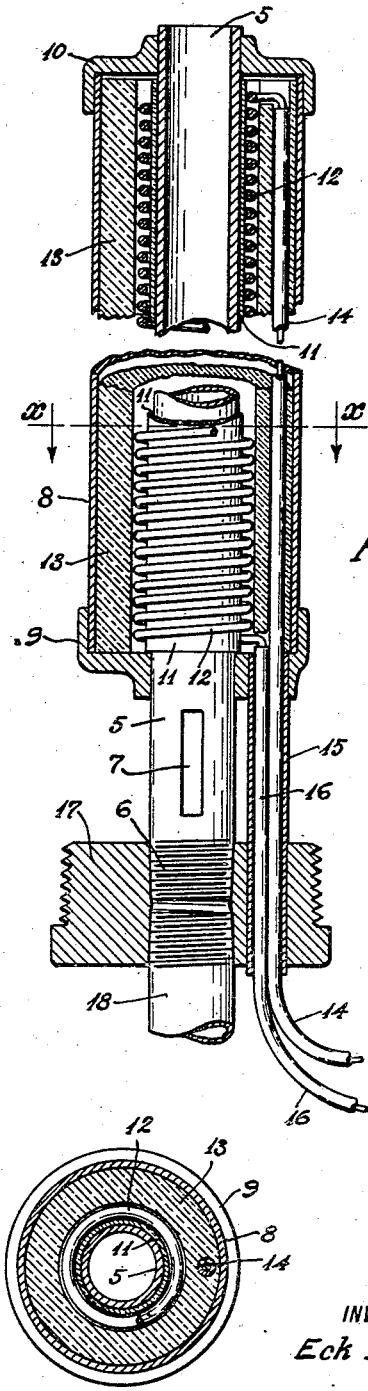
FIG. 2
FIG. 3
WITNESS
INVENTOR
Eck Baughn
BY
C. D. Haskins
ATTORNEY

UNITED STATES PATENT OFFICE.

ECK BAUGHN, OF NORTH YAKIMA, WASHINGTON.

ELECTRICAL LIQUID-HEATING DEVICE.

1,202,957.  Specification of Letters Patent.  Patented Oct. 31, 1916.

Application filed February 17, 1916. Serial No. 78,992.

*To all whom it may concern:*

Be it known that I, ECK BAUGHN, citizen of the United States, residing at North Yakima, in the county of Yakima and State of Washington, have invented a certain new and useful Improvement in Electrical Liquid-Heating Devices, of which the following is a specification.

My invention relates to improvements in electrical liquid-heating devices and the object of my invention is to provide an electrical heating element of cylindrical form which is adapted to be vertically disposed within a closed receptacle, as a closed tank or a boiler, with one of its ends rigidly associated with a wall of said receptacle in such manner that said one of its ends shall be adapted to be connected with an intake conduit for liquid, said heating element being provided with a concentrically disposed open passageway in its central portion to extend through its length whereby colder portions of the liquid contained in said receptacle may enter the bottom end of said passageway to flow upwardly therethrough and out of the top thereof thus to be heated by the electrically heated walls of said passageway during the passage of said liquid therethrough, whereby said liquid may be caused continuously to circulate and be heated within said receptacle in an obvious manner. I accomplish this object by devices illustrated in the accompanying drawings wherein—

Figure 1 is a view in side elevation of a water tank within which is disposed an electrical heating element embodying my invention, portions of the walls of which tank are broken away better to disclose the disposition of said electrical heating element, and Fig. 2 is a fragmentary view, on an enlarged scale, of said electrical heating element in vertical mid-section thereof and showing some of its internal parts in side elevation, while Fig. 3 is a view in cross-section of the same on broken line *x, x* of Fig. 2.

Referring to the drawings, throughout which like reference numerals indicate like parts, a metal tube 5, which is open at both of its ends, is provided with an external screw-thread 6 on one of its end portions and further provided with oblong slotted openings, as slotted opening 7, disposed to extend through its walls at different circumferential points near said screw-thread 6. Surrounding said tube 5 to be concentric therewith is a larger tube 8 which extends from a point near said openings 7 to a point near the other end of said tube 5 and which is secured in its concentric position by means of annular flanged collars 9 and 10, respectively, within whose flanged portions are projected the respective ends of said tube 8 whereby is formed an annular inclosed space extending between said collars 9 and 10. Within said annular space the smaller tube 5 is covered with a thin layer 11 of refractory insulating material, as of mica or porcelain, and disposed in engagement with said layer 11 to surround it is a helix 12 of wire made of metal having characteristics that adapt it to be heated readily in response to the passage through it of a comparatively weak current of electricity. The annular space surrounding said helix 12 is filled by an insulator 13 comprising a tube-like mass of refractory material that is preferably a poor conductor of heat; and embedded within the annular wall of said insulator 13 is an insulated end portion 14 of wire which is integrally connected with the helix 12 at that end of said helix 12 that is adjacent to the flanged collar 10, said end portion 14 being extended outwardly through a tube 15 by the side of another insulated end portion 16 of wire which is integrally connected with the helix 12 at that end which is adjacent to the flanged collar 9. One end of the tube 15 is tightly fastened into a hole that extends through the flanged collar 9 to extend outwardly therefrom to and through the annular wall of an internally and externally screw-threaded bushing 17 a portion of whose internal screw-thread engages with the screw-thread 6 on the adjacent end of the tube 5, the remaining portion of whose internal screw-thread engages with screw-threads on a nipple 18. The conducting wires 14 and 16 may be extended to connect with a switch-controlled electric circuit, not shown, from which electricity may flow through the helix 12 to heat said helix 12 in a well known manner.

In Fig. 1 I have illustrated how the structure of Figs. 2 and 3 may be associated with a closed tank, thereby to heat liquid that may be contained therein, and in said Fig. 1 a closed tank 20 of cylindrical form is vertically disposed and its bottom and top walls 21 and 22, respectively, are each provided with a centrally disposed screw-threaded opening of a size that adapts it to permit the introduction of the electrical heater which is illustrated in Figs. 1 and 2 and which is supported in a concentric position therein by the bushing 17 which is screwed into the screw-threaded opening in the bottom wall 21 of said tank 20. The nipple 18 is disposed to communicate with the tube 5 within the bushing 17 and said nipple 18 is connected with an elbow 23 to which is connected a valve-controlled supply pipe 19 whereby water or other liquid to be heated may be admitted into the lower end of the tube 5 to flow upwardly therethrough, or to flow outwardly therefrom through the slotted openings 7, to fill the tank 20. The screw-threaded opening in the central portion of the top wall 22 of the tank 20 is closed by a removable plug 24. Screwed into the top wall 22 at a point between the plug 24 and the cylindrical wall of the tank 20 is a valve-controlled outlet pipe 25 which may be extended to a desired point and through which heated liquid may be drawn from the upper portion of the interior of said tank.

The mode of operation of the structures thus far described may be explained as follows: The conducting wires 14 and 16 being connected with a switch-controlled electric circuit and the valve-controlled pipe 19 being extended to connect with a source of water under pressure, then the valve in the pipe 25 is opened, whereupon the valve of the pipe 19 is opened to permit cold water under pressure to flow therethrough to fill the tank 20 and then the valve in the pipe 25 is closed (to be maintained closed at all times except when it is desired to draw hot water from the said tank 20) and thereupon electricity is permitted to flow through the helix 12 to heat it, and said helix 12 will then transmit such heat to the walls of the tube 5 which will heat the water therein, which water, as it is heated, will flow upwardly and out of the top of said tube 5 into the upper portion of the tank 20 while colder water from the bottom portion of said tank 20 will flow through openings 7 into tube 5 to be heated in its turn and flow upwardly therethrough into the upper portion of said tank 20, and thus the same water within the tank 20 will circulate continuously (so long as the helix 12 is supplied with a required current of electricity) with the effect that the hottest portion of such water will always be in the upper portion of the tank 20. When, however, hot water is drawn from the tank 20 through the pipe 25 then obviously a like amount of cold water will flow from the supply pipe 19 into said tank 20 to circulate and be heated in a like manner. Under some conditions it may be desired to dispose the cold water supply pipe, as well as the hot water outlet pipe, in association with the top wall of a tank, like the tank 20, and in order to do so I have provided a valve-controlled pipe 26 secured in the top wall 22 at a point opposite the pipe 25, which pipe 26 is disposed to extend through said wall 22 and downwardly therefrom to the bottom portion of the interior of said tank 20, as indicated by dotted lines in Fig. 1, and said valve-controlled pipe 26 may be extended to the source of water under pressure instead of the pipe 19, but in such case the nipple 18 would be removed from the bushing 17 to be replaced by a screw-threaded plug, and under such condition cold water would then be admitted into the bottom portion of the interior of the tank 20 through the valve-controlled pipe 26 to circulate in the manner described; and under such conditions, if desired, the heating element supported by the bushing 17 could be inverted to hang from the top wall 22 by reversing the positions of the plugs 24 and 17, in an obvious manner, without changing the mode of operation of heating the water within the tank 20.

Obviously, changes may be made in the forms, dimensions and arrangement of parts of my invention without departing from the spirit thereof.

What I claim is:

1. An electric liquid-heating device of the class described, which embodies a tank adapted to contain liquid, and provided with an internally screw-threaded opening disposed to extend through its top wall together with a like internally screw-threaded opening disposed to extend through its bottom wall; a screw-threaded plug adapted to close a desired one of said screw-threaded openings; an externally and internally screw-threaded bushing adapted to be disposed with its external thread screwed into the unplugged one of said screw-threaded openings; an electric heating element of a size to adapt it to be introduced into said tank through either of said screw-threaded openings, which heating element is provided with a screw-threaded portion that is adapted to be screwed into the internally screw-threaded portion of said bushing thereby to support said heating element in a vertical position within said tank when said bushing, thus associated with said heating element, is screwed into one of said screw-threaded openings; means for admitting liquid under pressure into the lower portion of the space within said tank; and means for conducting liquid from the top portion of the space within said tank.

2. An electric liquid-heating device of the class described, which embodies an electric heating element that includes a metal tube provided on one of its end portions with an external screw-thread; an internally and externally screw-threaded bushing disposed with a portion of its internal screw-thread screwed on to said one screw-threaded end portion of said tube; an externally screw-threaded plug adapted to be removably engaged with the remaining portion of the internal screw-thread of said bushing; a slotted opening disposed to extend through the wall of said tube in a position adjacent to said bushing; two flanged collars fixed on said tube, one adjacent to said opening and the other adjacent to the other end of said tube; a larger tube concentrically disposed to surround said first named tube with its opposite ends engaged with and supported by the flanges of said flanged collars, whereby is provided an annular inclosed space; a layer of refractory electrical insulating material within said annular space and disposed to cover the surface of said first named tube therewithin; an electrical heating member comprising a helix of wire disposed to surround and engage with said layer of insulating material; a mass of electrical insulating material, that is a poor conductor of heat, disposed to fill the annular space between said helix and the wall of said larger tube; a water tight conduit extending through said bushing and through the adjacent flanged collar to said annular space; and insulated conducting wires disposed to extend through said conduit into said annular space to connect each with a different terminal of said helix.

In witness whereof, I hereunto subscribe my name this 2nd day of February A. D., 1916.

ECK BAUGHN.

Witnesses:
C. E. DWINELL,
L. HEILMAN.